(12) United States Patent
Chishti

(10) Patent No.: US 10,051,124 B1
(45) Date of Patent: *Aug. 14, 2018

(54) TECHNIQUES FOR BEHAVIORAL PAIRING IN A CONTACT CENTER SYSTEM

(71) Applicant: Afiniti Europe Technologies Limited, Cheshire (GB)

(72) Inventor: Zia Chishti, Washington, DC (US)

(73) Assignee: Afiniti Europe Technologies Limited, Cheshire (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/000,797

(22) Filed: Jan. 19, 2016

Related U.S. Application Data

(63) Continuation of application No. 14/871,658, filed on Sep. 30, 2015, now Pat. No. 9,300,802, which is a continuation-in-part of application No. 14/530,058, filed on Oct. 31, 2014, now Pat. No. 9,277,055, which is a continuation of application No. 13/843,724, filed on Mar. 15, 2013, now Pat. No. 8,879,715, said
(Continued)

(51) Int. Cl.
*H04M 3/00* (2006.01)
*H04M 5/00* (2006.01)
*H04M 3/523* (2006.01)
*H04M 3/51* (2006.01)

(52) U.S. Cl.
CPC ....... *H04M 3/5232* (2013.01); *H04M 3/5183* (2013.01)

(58) Field of Classification Search
USPC ............... 379/265.01, 266.01, 309; 705/7.13
See application file for complete search history.

(56) References Cited

U.S. PATENT DOCUMENTS

| | | |
|---|---|---|
| 5,155,763 A | 10/1992 | Bigus et al. |
| 5,206,903 A | 4/1993 | Kohler et al. |

(Continued)

FOREIGN PATENT DOCUMENTS

| | | |
|---|---|---|
| AU | 2008349500 C1 | 5/2014 |
| AU | 2009209317 B2 | 5/2014 |

(Continued)

OTHER PUBLICATIONS

Anonymous. (2006) "Performance Based Routing in Profit Call Centers," The Decision Makers' Direct, located at www.decisioncraft.com, Issue Jan. 6, 2012 (3 pages).
(Continued)

*Primary Examiner* — Quynh Nguyen
(74) *Attorney, Agent, or Firm* — Wilmer Cutler Pickering Hale and Dorr LLP

(57) ABSTRACT

Techniques for behavioral pairing in a contact center system are disclosed. In one particular embodiment, the techniques may be realized as a method for pairing in a contact center including ordering one or more contacts, ordering one or more agents, comparing a first difference in ordering between a first contact and a first agent in a first pair with a second difference in ordering between a second contact and a second agent in a second pair, and selecting the first pair or the second pair for connection based on the comparing, wherein the first contact and the second contact are different or the first agent and the second agent are different.

17 Claims, 7 Drawing Sheets

Related U.S. Application Data application No. 14/871,658 is a continuation-in-part of application No. 12/021,251, filed on Jan. 28, 2008.

(60) Provisional application No. 61/615,772, filed on Mar. 26, 2012, provisional application No. 61/615,788, filed on Mar. 26, 2012, provisional application No. 61/615,779, filed on Mar. 26, 2012.

(56) References Cited

U.S. PATENT DOCUMENTS

| | | | |
|---|---|---|---|
| 5,327,490 A | 7/1994 | Cave | |
| 5,537,470 A | 7/1996 | Lee | |
| 5,702,253 A | 12/1997 | Bryce et al. | |
| 5,825,869 A | 10/1998 | Brooks et al. | |
| 5,903,641 A | 5/1999 | Tonisson | |
| 5,907,601 A | 5/1999 | David et al. | |
| 5,926,538 A | 7/1999 | Deryugin et al. | |
| 6,049,603 A | 4/2000 | Schwartz et al. | |
| 6,052,460 A | 4/2000 | Fisher et al. | |
| 6,064,731 A | 5/2000 | Flockhart et al. | |
| 6,088,444 A | 7/2000 | Walker et al. | |
| 6,163,607 A | 12/2000 | Bogart et al. | |
| 6,222,919 B1 | 4/2001 | Hollatz et al. | |
| 6,292,555 B1 | 9/2001 | Okamoto | |
| 6,324,282 B1 | 11/2001 | McIllwaine et al. | |
| 6,333,979 B1 | 12/2001 | Bondi et al. | |
| 6,389,132 B1 | 5/2002 | Price | |
| 6,389,400 B1 | 5/2002 | Bushey et al. | |
| 6,408,066 B1 * | 6/2002 | Andruska | H04M 3/5233 379/265.12 |
| 6,411,687 B1 | 6/2002 | Bohacek et al. | |
| 6,424,709 B1 | 7/2002 | Doyle et al. | |
| 6,434,230 B1 | 8/2002 | Gabriel | |
| 6,496,580 B1 | 12/2002 | Chack | |
| 6,504,920 B1 | 1/2003 | Okon et al. | |
| 6,519,335 B1 | 2/2003 | Bushnell | |
| 6,526,135 B1 | 2/2003 | Paxson | |
| 6,535,601 B1 | 3/2003 | Flockhart et al. | |
| 6,570,980 B1 | 5/2003 | Baruch | |
| 6,587,556 B1 | 7/2003 | Judkins et al. | |
| 6,603,854 B1 | 8/2003 | Judkins et al. | |
| 6,639,976 B1 | 10/2003 | Shellum et al. | |
| 6,661,889 B1 | 12/2003 | Flockhart et al. | |
| 6,704,410 B1 | 3/2004 | McFarlane et al. | |
| 6,707,904 B1 | 3/2004 | Judkins et al. | |
| 6,714,643 B1 | 3/2004 | Gargeya et al. | |
| 6,763,104 B1 | 7/2004 | Judkins et al. | |
| 6,774,932 B1 | 8/2004 | Ewing et al. | |
| 6,775,378 B1 | 8/2004 | Villena et al. | |
| 6,798,876 B1 | 9/2004 | Bala | |
| 6,829,348 B1 | 12/2004 | Schroeder et al. | |
| 6,832,203 B1 | 12/2004 | Villena et al. | |
| 6,859,529 B2 | 2/2005 | Duncan et al. | |
| 6,922,466 B1 | 7/2005 | Peterson et al. | |
| 6,937,715 B2 | 8/2005 | Delaney | |
| 6,956,941 B1 | 10/2005 | Duncan et al. | |
| 6,970,821 B1 | 11/2005 | Shambaugh et al. | |
| 6,978,006 B1 | 12/2005 | Polcyn | |
| 7,023,979 B1 | 4/2006 | Wu et al. | |
| 7,039,166 B1 | 5/2006 | Peterson et al. | |
| 7,050,566 B2 | 5/2006 | Becerra et al. | |
| 7,050,567 B1 | 5/2006 | Jensen | |
| 7,062,031 B2 | 6/2006 | Becerra et al. | |
| 7,068,775 B1 | 6/2006 | Lee | |
| 7,092,509 B1 | 8/2006 | Mears et al. | |
| 7,103,172 B2 | 9/2006 | Brown et al. | |
| 7,158,628 B2 | 1/2007 | McConnell et al. | |
| 7,184,540 B2 | 2/2007 | Dezonno et al. | |
| 7,209,549 B2 | 4/2007 | Reynolds et al. | |
| 7,231,032 B2 | 6/2007 | Nevman et al. | |
| 7,231,034 B1 | 6/2007 | Rikhy et al. | |
| 7,236,584 B2 | 6/2007 | Torba | |
| 7,245,716 B2 | 7/2007 | Brown et al. | |
| 7,245,719 B2 | 7/2007 | Kawada et al. | |
| 7,266,251 B2 | 9/2007 | Rowe | |
| 7,269,253 B1 | 9/2007 | Wu et al. | |
| 7,353,388 B1 | 4/2008 | Gilman et al. | |
| 7,398,224 B2 | 7/2008 | Cooper | |
| 7,593,521 B2 | 9/2009 | Becerra et al. | |
| 7,676,034 B1 | 3/2010 | Wu et al. | |
| 7,725,339 B1 | 5/2010 | Aykin | |
| 7,734,032 B1 | 6/2010 | Kiefhaber et al. | |
| 7,826,597 B2 | 11/2010 | Berner et al. | |
| 7,864,944 B2 | 1/2011 | Khouri et al. | |
| 7,899,177 B1 | 3/2011 | Bruening et al. | |
| 7,916,858 B1 | 3/2011 | Heller et al. | |
| 7,940,917 B2 | 5/2011 | Lauridsen et al. | |
| 7,961,866 B1 | 6/2011 | Boutcher et al. | |
| 7,995,717 B2 | 8/2011 | Conway et al. | |
| 8,000,989 B1 | 8/2011 | Kiefhaber et al. | |
| 8,010,607 B2 | 8/2011 | McCormack et al. | |
| 8,094,790 B2 | 1/2012 | Conway et al. | |
| 8,126,133 B1 | 2/2012 | Everingham et al. | |
| 8,140,441 B2 | 3/2012 | Cases et al. | |
| 8,175,253 B2 | 5/2012 | Knott et al. | |
| 8,229,102 B2 | 7/2012 | Knott et al. | |
| 8,249,245 B2 | 8/2012 | Jay et al. | |
| 8,295,471 B2 | 10/2012 | Spottiswoode et al. | |
| 8,300,798 B1 | 10/2012 | Wu et al. | |
| 8,359,219 B2 | 1/2013 | Chishti et al. | |
| 8,433,597 B2 | 4/2013 | Chishti et al. | |
| 8,472,611 B2 | 6/2013 | Chishti | |
| 8,565,410 B2 | 10/2013 | Chishti et al. | |
| 8,634,542 B2 | 1/2014 | Spottiswoode et al. | |
| 8,644,490 B2 | 2/2014 | Stewart | |
| 8,670,548 B2 | 3/2014 | Xie et al. | |
| 8,699,694 B2 | 4/2014 | Chishti et al. | |
| 8,712,821 B2 | 4/2014 | Spottiswoode | |
| 8,718,271 B2 | 5/2014 | Spottiswoode | |
| 8,724,797 B2 | 5/2014 | Chishti et al. | |
| 8,731,178 B2 | 5/2014 | Chishti et al. | |
| 8,737,595 B2 | 5/2014 | Chishti et al. | |
| 8,750,488 B2 | 6/2014 | Spottiswoode et al. | |
| 8,781,100 B2 | 7/2014 | Spottiswoode et al. | |
| 8,781,106 B2 | 7/2014 | Afzal | |
| 8,792,630 B2 | 7/2014 | Chishti et al. | |
| 8,824,658 B2 | 9/2014 | Chishti | |
| 8,879,715 B2 | 11/2014 | Spottiswoode et al. | |
| 8,903,079 B2 | 12/2014 | Xie et al. | |
| 8,929,537 B2 | 1/2015 | Chishti et al. | |
| 8,995,647 B2 | 3/2015 | Li et al. | |
| 9,020,137 B2 | 4/2015 | Chishti et al. | |
| 9,025,757 B2 | 5/2015 | Spottiswoode et al. | |
| 9,277,055 B2 | 3/2016 | Spottiswoode et al. | |
| 9,300,802 B1 | 3/2016 | Chishti | |
| 9,426,296 B2 | 8/2016 | Chishti et al. | |
| 2001/0032120 A1 | 10/2001 | Stuart et al. | |
| 2002/0018554 A1 | 2/2002 | Jensen et al. | |
| 2002/0046030 A1 | 4/2002 | Haritsa et al. | |
| 2002/0059164 A1 | 5/2002 | Shtivelman | |
| 2002/0082736 A1 | 6/2002 | Lech et al. | |
| 2002/0110234 A1 | 8/2002 | Walker et al. | |
| 2002/0111172 A1 | 8/2002 | DeWolf et al. | |
| 2002/0131399 A1 | 9/2002 | Philonenko | |
| 2002/0138285 A1 | 9/2002 | DeCotiis et al. | |
| 2002/0143599 A1 | 10/2002 | Nourbakhsh et al. | |
| 2002/0161765 A1 | 10/2002 | Kundrot et al. | |
| 2002/0184069 A1 | 12/2002 | Kosiba et al. | |
| 2002/0196845 A1 | 12/2002 | Richards et al. | |
| 2003/0002653 A1 | 1/2003 | Uckun | |
| 2003/0081757 A1 | 5/2003 | Mengshoel et al. | |
| 2003/0095652 A1 | 5/2003 | Mengshoel et al. | |
| 2003/0169870 A1 | 9/2003 | Stanford | |
| 2003/0174830 A1 | 9/2003 | Boyer et al. | |
| 2003/0217016 A1 | 11/2003 | Pericle | |
| 2004/0028211 A1 | 2/2004 | Culp et al. | |
| 2004/0057416 A1 | 3/2004 | McCormack | |
| 2004/0096050 A1 | 5/2004 | Das et al. | |
| 2004/0098274 A1 | 5/2004 | Dezonno et al. | |
| 2004/0101127 A1 | 5/2004 | Dezonno et al. | |
| 2004/0109555 A1 | 6/2004 | Williams | |
| 2004/0133434 A1 | 7/2004 | Szlam et al. | |
| 2004/0210475 A1 | 10/2004 | Starnes et al. | |

(56) References Cited

U.S. PATENT DOCUMENTS

| | | |
|---|---|---|
| 2004/0230438 A1 | 11/2004 | Pasquale et al. |
| 2004/0267816 A1 | 12/2004 | Russek |
| 2005/0013428 A1 | 1/2005 | Walters |
| 2005/0043986 A1 | 2/2005 | McConnell et al. |
| 2005/0047581 A1 | 3/2005 | Shaffer et al. |
| 2005/0047582 A1 | 3/2005 | Shaffer et al. |
| 2005/0071223 A1 | 3/2005 | Jain et al. |
| 2005/0129212 A1 | 6/2005 | Parker |
| 2005/0135593 A1 | 6/2005 | Becerra et al. |
| 2005/0135596 A1 | 6/2005 | Zhao |
| 2005/0187802 A1 | 8/2005 | Koeppel |
| 2005/0195960 A1 | 9/2005 | Shaffer et al. |
| 2005/0286709 A1 | 12/2005 | Horton et al. |
| 2006/0098803 A1 | 5/2006 | Bushey et al. |
| 2006/0110052 A1 | 5/2006 | Finlayson |
| 2006/0124113 A1 | 6/2006 | Roberts |
| 2006/0184040 A1 | 8/2006 | Keller et al. |
| 2006/0222164 A1 | 10/2006 | Contractor et al. |
| 2006/0233346 A1 | 10/2006 | McIlwaine et al. |
| 2006/0262918 A1 | 11/2006 | Karnalkar et al. |
| 2006/0262922 A1 | 11/2006 | Margulies et al. |
| 2007/0036323 A1 | 2/2007 | Travis |
| 2007/0071222 A1 | 3/2007 | Flockhart et al. |
| 2007/0116240 A1 | 5/2007 | Foley et al. |
| 2007/0121602 A1 | 5/2007 | Sin et al. |
| 2007/0121829 A1 | 5/2007 | Tal et al. |
| 2007/0136342 A1 | 6/2007 | Singhai et al. |
| 2007/0154007 A1 | 7/2007 | Bernhard |
| 2007/0174111 A1 | 7/2007 | Anderson et al. |
| 2007/0198322 A1 | 8/2007 | Bourne et al. |
| 2007/0219816 A1 | 9/2007 | Van Luchene et al. |
| 2007/0274502 A1 | 11/2007 | Brown |
| 2008/0002823 A1 | 1/2008 | Fama et al. |
| 2008/0008309 A1* | 1/2008 | Dezonno ............. H04M 3/5232 379/265.02 |
| 2008/0046386 A1 | 2/2008 | Pieraccinii et al. |
| 2008/0065476 A1 | 3/2008 | Klein et al. |
| 2008/0118052 A1 | 5/2008 | Houmaidi et al. |
| 2008/0152122 A1 | 6/2008 | Idan et al. |
| 2008/0181389 A1 | 7/2008 | Bourne et al. |
| 2008/0199000 A1 | 8/2008 | Su et al. |
| 2008/0267386 A1 | 10/2008 | Cooper |
| 2008/0273687 A1 | 11/2008 | Knott et al. |
| 2009/0043670 A1 | 2/2009 | Johansson et al. |
| 2009/0086933 A1 | 4/2009 | Patel et al. |
| 2009/0190740 A1 | 7/2009 | Chishti et al. |
| 2009/0190743 A1 | 7/2009 | Spottiswoode |
| 2009/0190744 A1 | 7/2009 | Xie et al. |
| 2009/0190745 A1 | 7/2009 | Xie et al. |
| 2009/0190746 A1 | 7/2009 | Chishti et al. |
| 2009/0190747 A1 | 7/2009 | Spottiswoode |
| 2009/0190748 A1 | 7/2009 | Chishti et al. |
| 2009/0190749 A1 | 7/2009 | Xie et al. |
| 2009/0190750 A1 | 7/2009 | Xie et al. |
| 2009/0232294 A1 | 9/2009 | Xie et al. |
| 2009/0234710 A1 | 9/2009 | Belgaied Hassine et al. |
| 2009/0245493 A1 | 10/2009 | Chen et al. |
| 2009/0304172 A1 | 12/2009 | Becerra et al. |
| 2009/0318111 A1 | 12/2009 | Desai et al. |
| 2009/0323921 A1 | 12/2009 | Spottiswoode et al. |
| 2010/0020959 A1 | 1/2010 | Spottiswoode |
| 2010/0020961 A1 | 1/2010 | Spottiswoode |
| 2010/0054431 A1 | 3/2010 | Jaiswal et al. |
| 2010/0054452 A1 | 3/2010 | Afzal |
| 2010/0054453 A1 | 3/2010 | Stewart |
| 2010/0086120 A1 | 4/2010 | Brussat et al. |
| 2010/0111285 A1 | 5/2010 | Chishti |
| 2010/0111286 A1 | 5/2010 | Chishti |
| 2010/0111287 A1 | 5/2010 | Xie et al. |
| 2010/0111288 A1 | 5/2010 | Afzal et al. |
| 2010/0142698 A1 | 6/2010 | Spottiswoode et al. |
| 2010/0183138 A1 | 7/2010 | Spottiswoode et al. |
| 2011/0022357 A1 | 1/2011 | Vock et al. |
| 2011/0031112 A1 | 2/2011 | Birang et al. |
| 2011/0069821 A1 | 3/2011 | Korolev et al. |
| 2011/0125048 A1 | 5/2011 | Causevic et al. |
| 2012/0051536 A1 | 3/2012 | Chishti et al. |
| 2012/0051537 A1 | 3/2012 | Chishti et al. |
| 2012/0224680 A1 | 9/2012 | Spottiswoode et al. |
| 2012/0278136 A1 | 11/2012 | Flockhart et al. |
| 2013/0003959 A1 | 1/2013 | Nishikawa et al. |
| 2013/0251137 A1 | 9/2013 | Chishti et al. |
| 2014/0044246 A1 | 2/2014 | Klemm et al. |
| 2014/0079210 A1 | 3/2014 | Kohler et al. |
| 2014/0119531 A1 | 5/2014 | Tuchman et al. |
| 2014/0341370 A1 | 11/2014 | Li et al. |
| 2015/0055772 A1 | 2/2015 | Klemm et al. |
| 2016/0080573 A1 | 3/2016 | Chishti |

FOREIGN PATENT DOCUMENTS

| | | |
|---|---|---|
| AU | 2009311534 B2 | 8/2014 |
| CN | 102301688 B | 5/2014 |
| CN | 102017591 B | 11/2014 |
| EP | 0 493 292 A2 | 7/1992 |
| EP | 0 949 793 A1 | 10/1999 |
| EP | 1 032 188 A1 | 8/2000 |
| EP | 1335572 A2 | 8/2003 |
| JP | 11-098252 A | 4/1999 |
| JP | 2000-069168 A | 3/2000 |
| JP | 2000-078291 A | 3/2000 |
| JP | 2000-078292 A | 3/2000 |
| JP | 2000-092213 A | 3/2000 |
| JP | 2000-236393 A | 8/2000 |
| JP | 2001-292236 A | 10/2001 |
| JP | 2001-518753 A | 10/2001 |
| JP | 2002-297900 A | 10/2002 |
| JP | 3366565 B2 | 1/2003 |
| JP | 2003-187061 A | 7/2003 |
| JP | 2004-056517 A | 2/2004 |
| JP | 2004-227228 A | 8/2004 |
| JP | 2006-345132 A | 12/2006 |
| JP | 2007-324708 A | 12/2007 |
| JP | 2011-511533 A | 4/2011 |
| JP | 2011-511536 A | 4/2011 |
| JP | 5421928 B2 | 2/2014 |
| JP | 5631326 B2 | 11/2014 |
| JP | 5649575 B2 | 1/2015 |
| JP | 2015-514371 A | 5/2015 |
| MX | 316118 | 12/2013 |
| MX | 322251 | 7/2014 |
| NZ | 587100 B | 10/2013 |
| NZ | 587101 B | 10/2013 |
| NZ | 591486 B | 1/2014 |
| NZ | 592781 | 3/2014 |
| PH | 1-2010-501704 | 2/2014 |
| PH | 1-2010-501705 | 2/2015 |
| WO | WO-1999/017517 A1 | 4/1999 |
| WO | WO-2001/063894 A2 | 8/2001 |
| WO | WO-2006/124113 A2 | 11/2006 |
| WO | WO-2010/053701 A2 | 5/2010 |
| WO | WO-2011/081514 A1 | 7/2011 |

OTHER PUBLICATIONS

Cleveland, William S., "Robust Locally Weighted Regression and Smoothing Scatterplots," Journal of the American Statistical Association, vol. 74, No. 368, pp. 829-836 (Dec. 1979).

Gans, N. et al. (2003), "Telephone Call Centers: Tutorial, Review and Research Prospects," Manufacturing & Service Operations Management, vol. 5, No. 2, pp. 79-141.

International Preliminary Report on Patentability issued in connection with PCT Application No. PCT/US2009/066254 dated Jun. 14, 2011 (6 pages).

International Search Report issued in connection with International Application No. PCT/US13/33268 dated May 31, 2013 (2 pages).

International Search Report issued in connection with PCT Application No. PCT/US/2009/054352 dated Mar. 12, 2010, 5 pages.

International Search Report issued in connection with PCT Application No. PCT/US2008/077042 dated Mar. 13, 2009 (3 pages).

International Search Report issued in connection with PCT Application No. PCT/US2009/031611 dated Jun. 3, 2009 (5 pages).

(56) References Cited

OTHER PUBLICATIONS

International Search Report issued in connection with PCT Application No. PCT/US2009/066254 dated Feb. 24, 2010 (4 pages).
International Search Report issued in connection with PCT/US2009/061537 dated Jun. 7, 2010 (5 pages).
International Search Report issued in connection with PCT/US2013/033261 dated Jun. 14, 2013 (3 pages).
International Search Report issued in connection with PCT/US2013/33265 dated Jul. 9, 2013 (2 pages).
Koole, G. (2004). "Performance Analysis and Optimization in Customer Contact Centers," Proceedings of the Quantitative Evaluation of Systems, First International Conference, Sep. 27-30, 2004 (4 pages).
Koole, G. et al. (Mar. 6, 2006). "An Overview of Routing and Staffing Algorithms in Multi-Skill Customer Contact Centers," Manuscript, 42 pages.
Ntzoufras, "Bayesian Modeling Using Winbugs". Wiley Interscience, Chapter 5, Normal Regression Models, Oct. 18, 2007, pp. 155-220 (67 pages).
Press, W. H. and Rybicki, G. B., "Fast Algorithm for Spectral Analysis of Unevenly Sampled Data," The Astrophysical Journal, vol. 338, pp. 277-280 (Mar. 1, 1989).
Riedmiller, M. et al. (1993). "A Direct Adaptive Method for Faster Back Propagation Learning: The RPROP Algorithm," 1993 IEEE International Conference on Neural Networks, San Francisco, CA, Mar. 28-Apr. 1, 1993, 1:586-591.
Stanley et al., "Improving call center operations using performance-based routing strategies," Calif. Journal of Operations Management, 6(1), 24-32, Feb. 2008; retrieved from http://userwww.sfsu.edu/saltzman/Publist.html.
Subsequent Substantive Examination Report ssued in connection with Philippines Application No. 1-2010-501705 dated Jul. 14, 2014 (1 page).
Substantive Examination Report issued in connection with Philippines Application No. 1/2011/500868 dated May 2, 2014 (1 page).
Written Opinion of the International Searching Aurhority issued in connection with PCT Application No. PCT/US2008/077042 dated Mar. 13, 2009, 6 pages.
Written Opinion of the International Searching Authority issued in connection with International Application No. PCT/US13/33268 dated May 31, 2013, 7 pages.
Written Opinion of the International Searching Authority issued in connection with PCT Application No. PCT/US/2009/054352 dated Mar. 12, 2010, 5 pages.
Written Opinion of the International Searching Authority issued in connection with PCT Application No. PCT/US2009/031611 dated Jun. 3, 2009, 7 pages.
Written Opinion of the International Searching Authority issued in connection with PCT Application No. PCT/US2009/066254 dated Feb. 4, 2010, 5 pages.
Written Opinion of the International Searching Authority issued in connection with PCT/US2009/061537 dated Jun. 7, 2010, 10 pages.
Written Opinion of the International Searching Authority issued in connection with PCT/US2013/033261 dated Jun. 14, 2013, 7 pages.
Written Opinion of the International Searching Authority issued in connection with PCT/US2013/33265 dated Jul. 9, 2013, 7 pages.
Japanese Office Action issued by the Japan Patent Office for Application No. 2015-503396 dated Jun. 29, 2016 (7 pages).
Canadian Office Action issued in Canadian Patent Application No. 2713526, dated Oct. 25, 2016, 7 pages.
International Search Report and Written Opinion issued by the European Patent Office as International Searching Authority for International Application No. PCT/IB2016/001762 dated Feb. 20, 2017 (15 pages).
International Search Report and Written Opinion issued by the European Patent Office as International Searching Authority for International Application No. PCT/IB2016/001776 dated Mar. 3, 2017 (16 pages).
Extended European Search Report issued by the European Patent Office for European Application No. 17154781.3 dated May 4, 2017 (7 pages).
Extended European Search Report issued by the European Patent Office for European Application No. 17171761.4 dated Aug. 30, 2017 (8 pages).
International Search Report and Written Opinion issued by the European Patent Office as International Searching Authority for International Application No. PCT/IB2017/000570 dated Jun. 30, 2017 (13 pages).
Japanese Office Action issued by the Japanese Patent Office for Japanese Application No. 2016-159338 dated Oct. 11, 2017 (12 pages).
Japanese Office Action issued by the Japanese Patent Office for Japanese Application No. 2016-189126 dated Oct. 19, 2017 (24 pages).
Extended European Search Report issued by the European Patent Office for European Application No. 18168620.5 dated Jun. 12, 2018 (9 pages).

* cited by examiner

TECHNIQUES FOR BEHAVIORAL PAIRING IN A CONTACT CENTER SYSTEM

CROSS-REFERENCE TO RELATED APPLICATIONS

This application is a continuation of U.S. patent application Ser. No. 14/871,658, filed Sep. 30, 2015, which is a continuation-in-part of U.S. patent application Ser. No. 12/021,251, filed Jan. 28, 2008, and is a continuation-in-part of U.S. patent application Ser. No. 14/530,058, filed Oct. 31, 2014, which is a continuation of U.S. patent application Ser. No. 13/843,724, filed Mar. 15, 2013, now U.S. Pat. No. 8,879,715, issued Nov. 4, 2014, which claims priority to U.S. Provisional Patent Application No. 61/615,788, filed Mar. 26, 2012, U.S. Provisional Patent Application No. 61/615,779, filed Mar. 26, 2012, and U.S. Provisional Patent Application No. 61/615,772, filed Mar. 26, 2012, each of which is hereby incorporated by reference in its entirety as if fully set forth herein.

FIELD OF THE DISCLOSURE

This disclosure generally relates to contact centers and, more particularly, to techniques for behavioral pairing in a contact center system.

BACKGROUND OF THE DISCLOSURE

A typical contact center algorithmically assigns contacts arriving at the contact center to agents available to handle those contacts. At times, the contact center may have agents available and waiting for assignment to inbound or outbound contacts (e.g., telephone calls, Internet chat sessions, email). At other times, the contact center may have contacts waiting in one or more queues for an agent to become available for assignment.

In some typical contact centers, contacts are assigned to agents ordered based on time of arrival, and agents receive contacts ordered based on the time when those agents became available. This strategy may be referred to as a "first-in, first-out", "FIFO", or "round-robin" strategy. In some contact centers, contacts or agents are assigned into different "skill groups" or "queues" prior to applying a FIFO assignment strategy within each such skill group or queue. These "skill queues" may also incorporate strategies for prioritizing individual contacts or agents within a baseline FIFO ordering. For example, a high-priority contact may be given a queue position ahead of other contacts who arrived at an earlier time, or a high-performing agent may be ordered ahead of other agents who have been waiting longer for their next call. Regardless of such variations in forming one or more queues of callers or one or more orderings of available agents, contact centers typically apply FIFO to the queues or other orderings. Once such a FIFO strategy has been established, assignment of contacts to agents is automatic, with the contact center assigning the first contact in the ordering to the next available agent, or assigning the first agent in the ordering to the next arriving contact. In the contact center industry, the process of contact and agent distribution among skill queues, prioritization and ordering within skill queues, and subsequent FIFO assignment of contacts to agents is typically managed by a system referred to as an "Automatic Call Distributor" ("ACD").

Some contact centers may use a "performance based routing" or "PBR" approach to ordering the queue of available agents or, occasionally, contacts. For example, when a contact arrives at a contact center with a plurality of available agents, the ordering of agents available for assignment to that contact would be headed by the highest-performing available agent (e.g., the available agent with the highest sales conversion rate, the highest customer satisfaction scores, the shortest average handle time, the highest performing agent for the particular contact profile, the highest customer retention rate, the lowest customer retention cost, the highest rate of first-call resolution). PBR ordering strategies attempt to maximize the expected outcome of each contact-agent interaction but do so typically without regard for utilizing agents in a contact center uniformly. Consequently, higher-performing agents may receive noticeably more contacts and feel overworked, while lower-performing agents may receive fewer contacts and idle longer, potentially reducing their opportunities for training and improvement as well as potentially reducing their compensation.

In view of the foregoing, it may be understood that there is a need for a system that both attempts to balance the utilization of agents while improving contact center performance beyond what FIFO strategies deliver.

SUMMARY OF THE DISCLOSURE

Techniques for behavioral pairing in a contact center system are disclosed. In one particular embodiment, the techniques may be realized as a method for pairing in a contact center comprising ordering one or more contacts, ordering one or more agents, comparing, by at least one processor, a first difference in ordering between a first contact and a first agent in a first pair with a second difference in ordering between a second contact and a second agent in a second pair, and selecting, by the at least one processor, the first pair or the second pair for connection based on the comparing, wherein the first contact and the second contact may be different or the first agent and the second agent may be different.

In accordance with other aspects of this particular embodiment, selecting the first pair or the second pair based on the comparing may further comprise applying, by the at least one processor, a diagonal strategy to the orderings.

In accordance with other aspects of this particular embodiment, the ordering of one or more contacts or the ordering of one or more agents may be expressed as percentiles.

In accordance with other aspects of this particular embodiment, the ordering of one or more contacts or the ordering of one or more agents may be expressed as percentile ranges.

In accordance with other aspects of this particular embodiment, each of the one or more contacts or each of the one or more agents may be assigned a percentile within each contact or agent's respective percentile range.

In accordance with other aspects of this particular embodiment, an assigned percentile may be a midpoint of a percentile range.

In accordance with other aspects of this particular embodiment, an assigned percentile may be a random percentile of a percentile range.

In accordance with other aspects of this particular embodiment, the method may further comprise determining, by the at least one processor, a bandwidth for each contact type of the first and second contacts proportionate to a frequency at which contacts of each contact type become available for assignment.

In accordance with other aspects of this particular embodiment, the method may further comprise targeting, by the at least one processor, a balanced agent utilization.

In accordance with other aspects of this particular embodiment, targeting the balanced agent utilization may further comprise determining, by the at least one processor, proportional bandwidth for each of the one or more agents.

In accordance with other aspects of this particular embodiment, a selected agent of the selected pair may not be any of an agent lagging in a fairness metric, an agent rated highest in a performance metric, an agent rated highest in a performance metric for a particular contact type, an agent previously assigned to a contact of the selected pair, a sequentially labeled agent, or a randomly selected agent.

In accordance with other aspects of this particular embodiment, a selected contact of the selected pairing may not be any of a contact at a head of a queue in the contact center, a longest-waiting contact, a highest-priority contact, or a randomly selected contact.

In accordance with other aspects of this particular embodiment, the selected one of the first pair and the second pair may comprise a worse expected instant outcome than the other of the first pair and the second pair.

In accordance with other aspects of this particular embodiment, a higher-ordered agent may remain available for subsequent assignment to a similarly higher-ordered contact, or a higher-ordered contact may remain available for subsequent assignment to a similarly higher-ordered agent.

In another particular embodiment, the techniques may be realized as a system for behavioral pairing in a contact center system comprising at least one processor, wherein the at least one processor is configured to perform the above-described method.

In another particular embodiment, the techniques may be realized as system for pairing in a contact center system comprising at least one processor, wherein the at least one processor may be configured to perform the above-described method.

In another particular embodiment, the techniques may be realized as an article of manufacture for pairing in a contact center system comprising a non-transitory processor readable medium and instructions stored on the medium, wherein the instructions may be configured to be readable from the medium by at least one processor and thereby may cause the at least one processor to operate so as to perform the above-described method.

The present disclosure will now be described in more detail with reference to particular embodiments thereof as shown in the accompanying drawings. While the present disclosure is described below with reference to particular embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION

Figure 1:
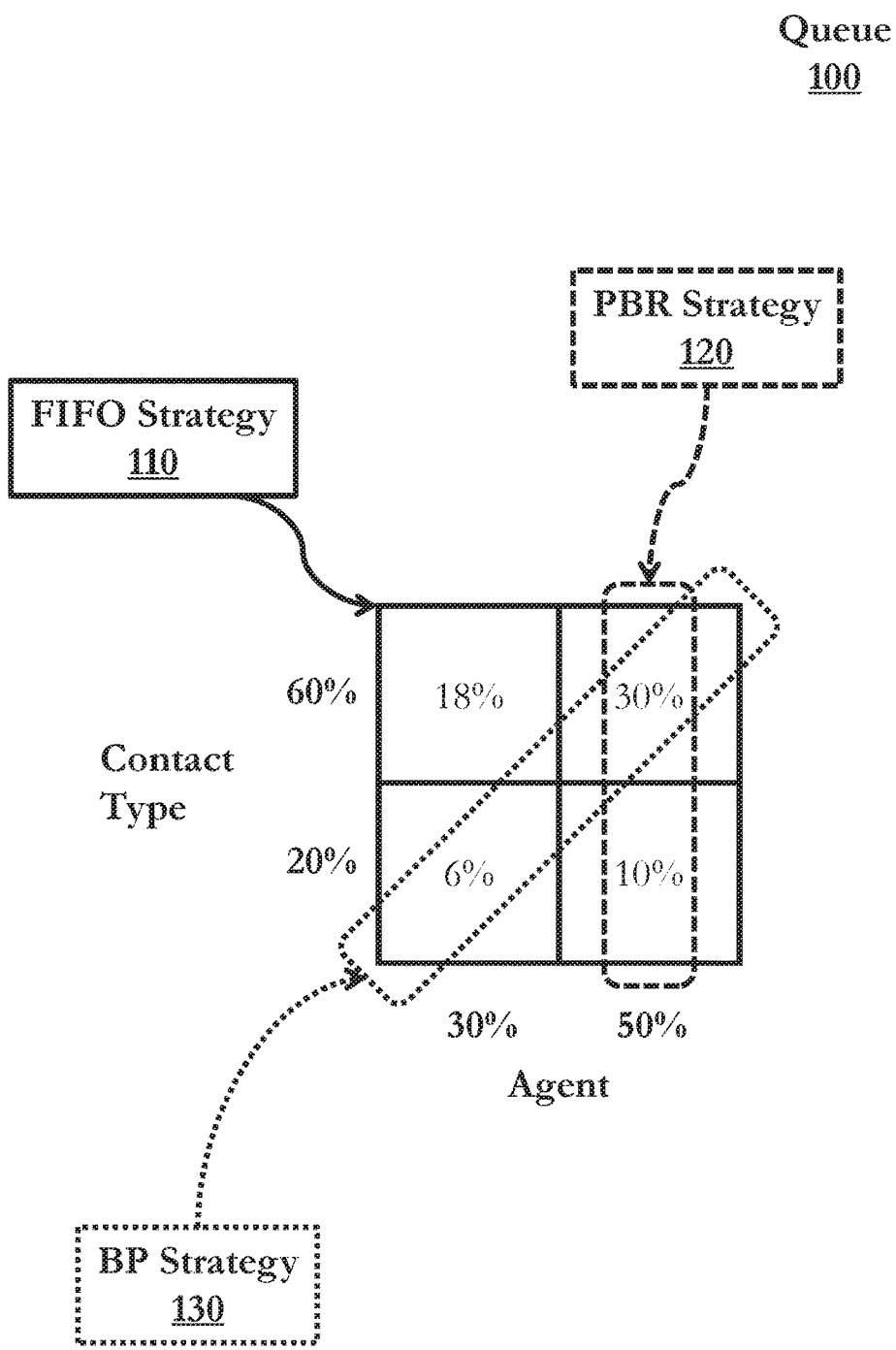
FIG. 1 shows a schematic representation of a queue according to embodiments of the present disclosure.

A typical contact center algorithmically assigns contacts arriving at the contact center to agents available to handle those contacts. At times, the contact center may be in an "L1 state" and have agents available and waiting for assignment to inbound or outbound contacts (e.g., telephone calls, Internet chat sessions, email). At other times, the contact center may be in an "L2 state" and have contacts waiting in one or more queues for an agent to become available for assignment. Such L2 queues could be inbound, outbound, or virtual queues. Contact center systems implement various strategies for assigning contacts to agents in both L1 and L2 states.

The present disclosure generally relates to contact center systems, traditionally referred to as "Automated Call Distribution" ("ACD") systems. Typically, such an ACD process is subsequent to an initial "Skills-based Routing" ("SBR") process that serves to allocate contacts and agents among skill queues within the contact center. Such skill queues may distinguish contacts and agents based on language capabilities, customer needs, or agent proficiency at a particular set of tasks.

The most common traditional assignment method within a queue is "First-In, First-Out" or "FIFO" assignment wherein the longest-waiting contact is assigned to the longest-waiting agent. Some contact centers implement "Performance-based Routing" ("PBR") wherein the longest waiting contact is assigned to the highest performing available agent. Variations of both such assignment methods commonly exist. For example, FIFO may select the least utilized available agent rather than the longest waiting agent. More generally, FIFO may select an agent most lagging in a particular metric or metrics. FIFO may also order queues of contacts where higher priority contact types may be positioned in a queue ahead of lower priority contact types. Similarly, PBR may be modified such that agent performance rankings may be altered depending on the type of contact pending assignment (e.g., Bala et al., U.S. Pat. No. 7,798,876). PBR may also be modified to avoid an extreme unbalancing of agent utilization by setting limits on maximum or minimum agent utilization relative to peers.

Variations of FIFO typically target "fairness" inasmuch as they are designed to balance the allocation of contacts to agents over time. PBR adopts a different approach in which the allocation of contacts to agents is purposefully skewed to increase the utilization of higher-performing agents and reduce the utilization of lower-performing agents. PBR may do so despite potential negative impacts on morale and productivity over time resulting from fatigue in over-utilized agents and inadequate opportunity for training and compensation in under-utilized agents.

Other eclectic assignment strategies are uncommonly, if ever, practiced. For instance, contacts may be randomly assigned to agents, irrespective of time of arrival, agent performance, or other variables. Alternatively, contact centers may seek to assign contacts to agents with whom they have had a recent previous interaction. Additionally, agents in an L1 scenario may be selected sequentially based on a "labelling strategy" in which a recurrent algorithmic ordering of agent assignment is predefined ("Agent 1", "Agent 2", "Agent 3", "Agent 1", "Agent 2", "Agent 3", "Agent 1", etc.).

In particular, the present disclosure refers to optimized strategies for assigning contacts to agents that improve upon traditional assignment methods. The present disclosure refers to such strategies as "Behavioral Pairing" or "BP" strategies. Behavioral Pairing targets balanced utilization of agents within queues (e.g., skill queues) while simultaneously improving overall contact center performance potentially beyond what FIFO or PBR methods will achieve in practice. This is a remarkable achievement inasmuch as BP acts on the same contacts and same agents as FIFO or PBR methods, approximately balancing the utilization of agents as FIFO provides, while improving overall contact center performance beyond what either FIFO or PBR provide in practice.

BP improves performance by assigning agent and contact pairs in a fashion that takes into consideration the assignment of potential subsequent agent and contact pairs such that when the benefits of all assignments are aggregated they may exceed those of FIFO and PBR strategies. In some cases, BP results in instant contact and agent pairings that may be the reverse of what FIFO or PBR would indicate. For example, in an instant case BP might select the shortest-waiting contact or the lowest-performing available agent. BP respects "posterity" inasmuch as the system allocates contacts to agents in a fashion that inherently forgoes what may be the highest-performing selection at the instant moment if such a decision increases the probability of better contact center performance over time.

FIG. 1 illustrates a mechanism by which BP improves on FIFO and PBR strategies. This example addresses a simplified hypothetical case (Queue 100) in which two types of contacts may be assigned to either of two agents in an environment in which the contact center is seeking to maximize sales. The two evenly distributed contact types are a "60% Contact" and "20% Contact", with the former more likely to make a purchase. The two agents are a "50% Agent" and a "30% Agent", with the former more likely to make a sale. This example further presumes that the four possible interactions between contacts and agents are multiplicative in outcome such that when a 60% Contact is assigned the 50% Agent, the overall probability of a sale is 30%. Accordingly, the four possible outcomes in this example are 6%, 10%, 18%, and 30%.

In FIFO Strategy 110, all four possible outcomes are equally likely. For example, if a 60% Contact arrives with both the 30% Agent and the 50% Agent available, either agent might be selected with equal probability based on, for example, which agent has been waiting longer or has been utilized less. Similarly, if the 30% Agent comes available with both a 60% Contact and a 20% Contact in Queue 100, either contact may be selected with equal probability and equal priority based on, for example, which contact has been waiting longer (e.g., earlier time of arrival). Therefore, in FIFO Strategy 100, the overall expected sales output of Queue 100 would be (6%+10%+18%+30%)/4=16%.

In PBR Strategy 120, the 50% Agent is preferentially assigned contacts whenever the 50% Agent is available. Therefore, PBR Strategy 120 would achieve its highest overall expected sales output in the case where the 50% Agent is always available upon arrival of a contact. This peak expectation is (10%+30%)/2=20%. However, this peak expectation is unlikely to be achieved in practice. For example, contacts may arrive while the 50% Agent is engaged and the 30% Agent is available. In this instance, PBR Strategy 120 would assign the contact to the 30% Agent. Thus, PBR performance in practice will approximate the performance of FIFO Strategy 110 in proportion to the percentage of instances in which non-preferred assignments occur. In many cases, multiple contacts may be waiting in Queue 100 (L2 state), and there may not be an opportunity to preferentially select the 50% Agent. If Queue 100 were persistently in an L2 state, PBR Strategy 120 would be expected to perform at the same rate as FIFO Strategy 110. In fact, if half the time Queue 100 were in an L2 state, and a further quarter of the time 50% Agent was unavailable because 50% Agent had been preferentially selected, then PBR Strategy 120 would still offer no expected improvement over FIFO Strategy 110. In Queue 100, PBR Strategy 120 only offers significant performance benefit over FIFO Strategy 110 when Queue 100 is in an L1 state for an extended period and, within that L1 state, there exists choice between the 50% Agent and the 30% Agent. However, in this case Queue 100 may be "overstaffed" inasmuch as it would require significant idle labor for potentially minor benefit. Accordingly, in practice PBR may be ineffective at substantially improving performance over FIFO.

In BP Strategy 130, a 20% Contact is preferentially assigned to the 30% Agent, and a 60% Contact is preferentially assigned to the 50% Agent. Therefore, the peak expectation of Queue 100 performance under BP Strategy 130 is (6%+30%)/2=18%. Importantly, this peak expectation does not erode like PBR Strategy 120 in an L2 state. Hypothetically, if there was an arbitrarily long queue of contacts in a persistent L2 state, BP Strategy 130 would in fact operate at peak expected performance because whenever the 30% Agent became available there would be a 60% Contact pending assignment, and whenever the 50% Agent became available there would be a 20% Contact pending assignment.

Even though there are only two agents maximally available in Queue 100, BP Strategy 130 may still outperform PBR Strategy 120 in an L1 state. For example, if the 50% Agent was occupied half of the time, PBR Strategy 120 would deliver no benefit as the other half of the time PBR Strategy 120 would be forced to select the 30% Agent. However, in an L1 state under BP Strategy 130, availability of a 20% Contact would trigger use of the lower-performing 30% Agent in the instant pairing, thereby preserving the higher-performing 50% Agent for subsequent assignment. Thereafter, in the next iteration, if a 60% Contact became available for assignment then the assignment of the pre-served 50% Agent would result in delivering BP Strategy 130's expected peak overall performance of 18%. This should occur approximately half the time, resulting in a significant improvement over both FIFO and PBR assignment strategies. When a pairing is to be made, the available agents may be ordered, and the available contacts may be ordered. In an L1 state, in which only one contact is available for assignment to an agent, the ordering of the agent is trivial. Similarly, in an L2 state, in which only one agent is available for assignment to a contact, the ordering of the contact is trivial.

Figure 2:
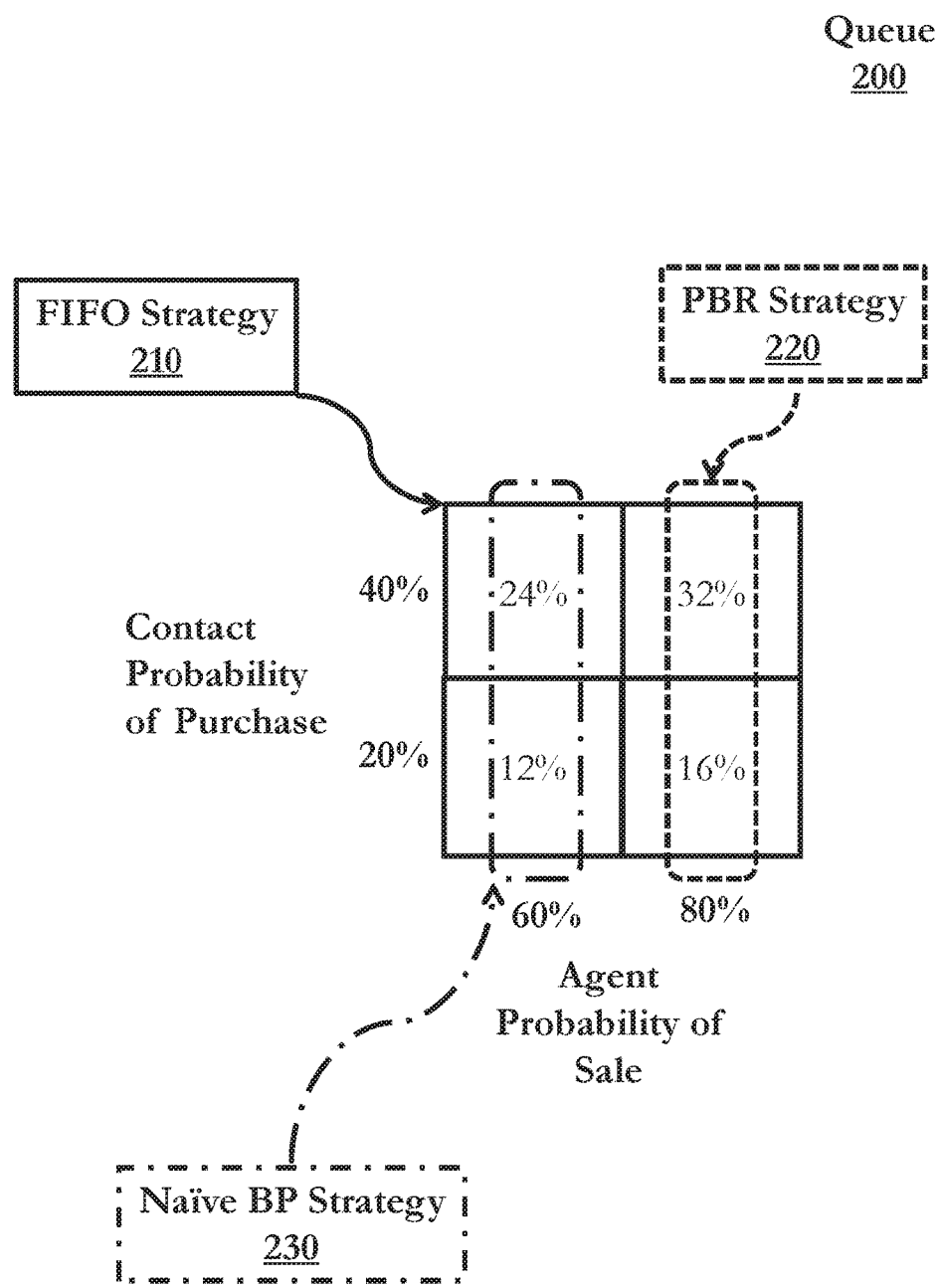
FIG. 2 shows a schematic representation of a queue according to embodiments of the present disclosure.

In FIG. 1, the 50% Agent was selected for preferential pairing with 60% Contacts, and the 30% Agent was selected for preferential pairing with 20% Contacts. A naïve interpretation of FIG. 1 might suggest that this process may be as simple as assigning contact types to agents that are closest in some metric (in FIG. 1, the probability of contributing to a successful sale). However, this may be an inefficient approach. FIG. 2 further advances the concept of BP by illustrating how such a naïve approach may be inefficient.

In FIG. 2, hypothetical Queue 200 serves two types of contacts: "40% Contacts" that contribute a 40% probability towards a purchase, and "20% Contacts". Queue 200 also has two agents: an "80% Agent" that contributes an 80% probability towards a sale, and a "60% Agent". Notably, both 40% Contacts and 20% Contacts are closer in their chosen metric to the 60% Agent than to the 80% Agent. Accordingly, Naïve BP Strategy 230 would preferentially pair both 20% Contacts and 40% Contacts to the 60% Agent, leaving higher-performing 80% Agent idle. This may, in fact, result in an expected peak outcome of (12%+24%)/2=18%, significantly worse than either FIFO Strategy 210 with expected outcome of (12%+16%+24%+32%)/4=21%, or PBR Strategy 220 with expected peak outcome of (16%+32%)/2=24%.

Figure 3:
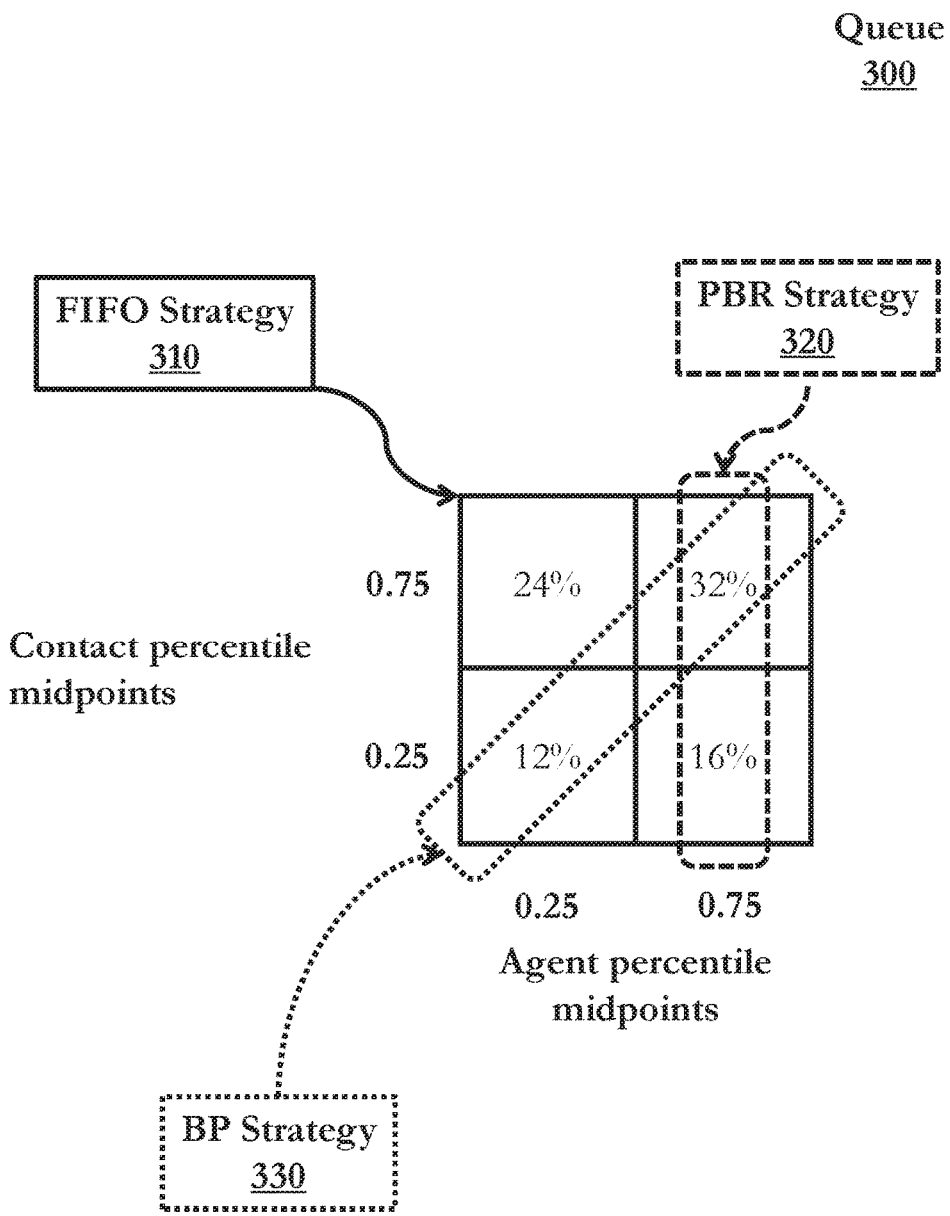
FIG. 3 shows a schematic representation of a queue according to embodiments of the present disclosure.

FIG. 3 illustrates how the naïve approach of FIG. 2 may be improved. Queue 300 is similar to Queue 200 inasmuch as there are two types of contacts that occur with equal frequency, two agents, and four corresponding quadrants with sale probabilities identical to those of Queue 200. However, contacts are no longer labeled based on their contribution towards a probability of purchase. Instead, the contacts have been ordered based on their relative contribution and then percentiled such that the lower-ordered contacts occupy percentile range of 0% to 50%, with a midpoint of 25% ("0.25 Contacts") and the higher-ordered contacts occupy the percentile range of 50% to 100%, with a midpoint of 75% ("0.75 Contacts"). For clarity, this disclosure refers to percentile ranges as ranges of percentages, or fractional percentages ranging between 0 and 1. In some embodiments, other n-tile or percentage ranges may be used.

Similarly, the agents have been ordered and percentiled into a 0.25 Agent and a 0.75 Agent. Contacts are then positioned on a first axis (in this instance, the Y-axis, or the rows of a grid) in order from lowest percentile midpoint to highest, and agents are similarly positioned on a second axis (in this instance, the X-axis, or the columns of the grid). Under such a structure, the diagonal strategy of assigning pairings of contacts with agents with the closest percentile midpoints is an improved mechanism of structuring a BP strategy, in this case BP Strategy 330. Under BP Strategy 330, the expected peak performance of Queue 300 would be (12%+32%)/2=22%, which exceeds FIFO Strategy 310's expected performance of (12%+16%+24%+32%)/4=21%, and may potentially exceed PBR Strategy 320's expected peak performance of (16%+32%)/2=24%.

While FIG. 1 and FIG. 3 illustrate how BP can improve performance over FIFO and PBR strategies, they do so by making the assumption that different types of contacts arrive in equal proportion. Such an assumption may be incorrect in practice, and extending the concepts of FIGS. 1 and 3 into a more common environment of more than two contact types or into a more common environment where the proportions of contact types vary may prove to be inefficient. Similarly, FIGS. 1 and 3 make the assumption that only two contact center agents are assigned to a queue. However, in many contact centers the actual number of agents assigned to a queue is significantly greater.

Figure 4:
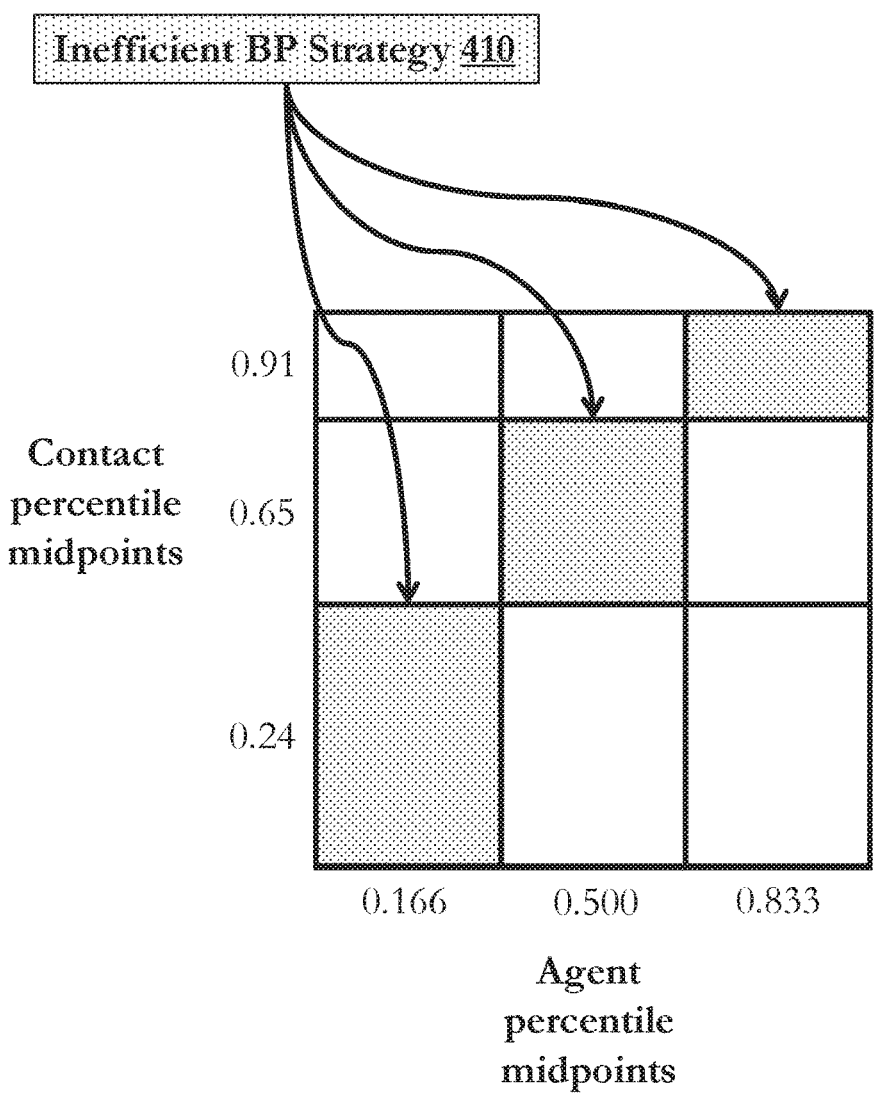
FIG. 4 shows a schematic representation of a queue according to embodiments of the present disclosure.

FIG. 4 illustrates how the strategy of FIG. 3 may prove to be inefficient and how to improve on such a strategy. Hypothetical Queue 400 defines three contact types: "0.24 Contact" type that spans a percentile range of 0% to 48%, "0.65 Contact" type that spans a percentile range of 48% to 82%, and "0.91 Contact" type that spans a percentile range of 82% to 100%. Therefore, 0.24 Contacts constitute 48% of the contact center contacts, 0.65 Contacts constitute 34%, and 0.91 Contacts represent the balance of 18%. Therefore, 0.24 Contacts may be assumed to be the lowest-ordered contacts along some metric, while 0.91 Contacts may be assumed to be the highest-ordered.

Queue 400 has three equally available agents: a "0.166 Agent", a "0.500 Agent", and a "0.833 Agent". The 0.166 Agent occupies the midpoint of percentile range 0% to 33.3% and therefore is the lowest-ordered agent according to some metric, while correspondingly 0.833 Agent occupies the midpoint of percentile range 66.6% to 100% and is therefore the highest-ordered agent. Agent 0.500 is the middle-ordered agent occupying the percentile range of 33.3% to 66.6%.

Inefficient BP Strategy 410 would strictly extend the strategy in FIG. 3 of preferentially pairing contacts with agents based on proximity in percentile midpoint. This would result in 0.24 Contacts being preferentially assigned to 0.166 Agent, 0.65 Contacts being assigned to 0.500 Agent, and 0.91 Contacts being assigned to 0.833 Agent. Such a strategy would create a potential inefficiency inasmuch as it would tend towards utilizing Agent 0.166 most heavily and Agent 0.833 least heavily. This is so because the 0.24 Contacts represent 48% of all contacts and are preferentially allocated to Agent 0.166 that only represents 33.3% of agent availability. Similarly, the 0.91 Contacts represent 18% of all contacts and are preferentially allocated to Agent 0.833, also representing 33.3% of agent availability and hence potentially underutilized as a result. Such a bias towards utilizing lower-ordered Agents may result in Inefficient BP Strategy 410 delivering a suboptimal performance which may be below that of FIFO or PBR.

Figure 5:
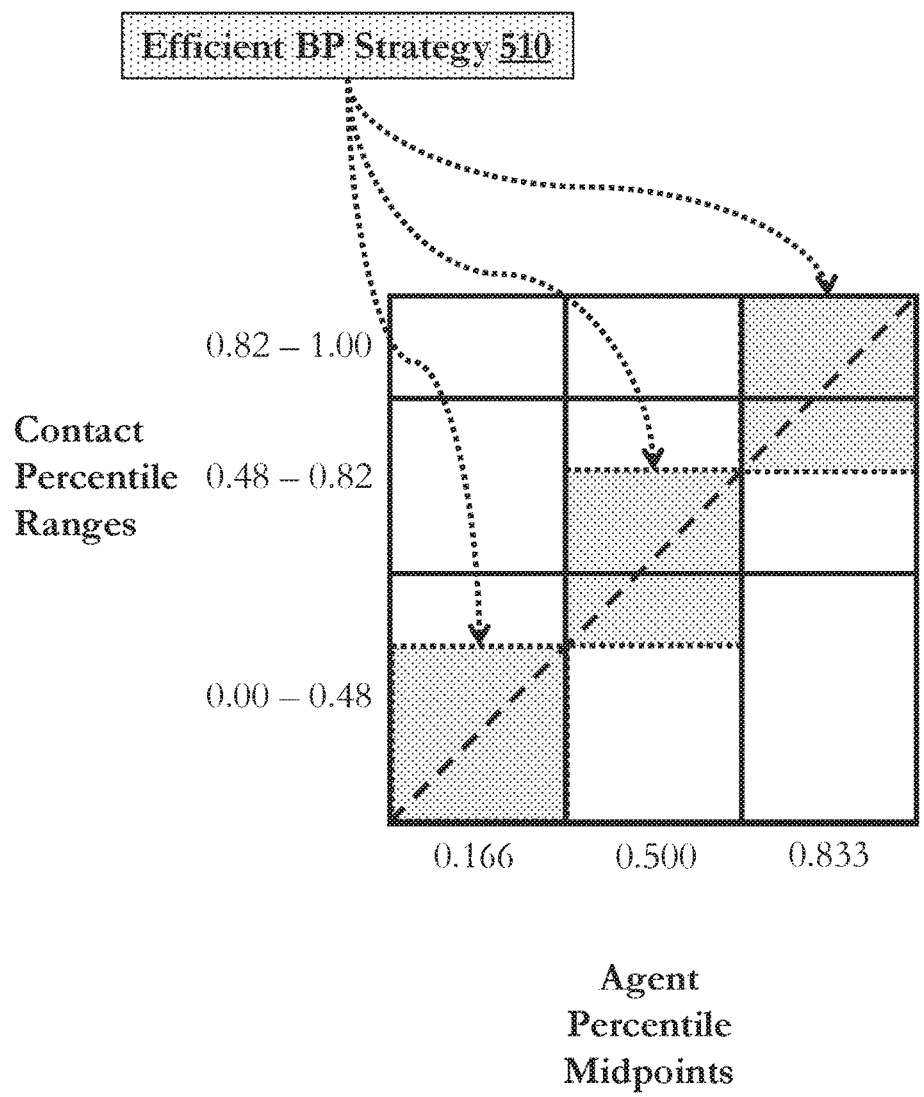
FIG. 5 shows a schematic representation of a queue according to embodiments of the present disclosure.

FIG. 5 illustrates techniques to improve on Inefficient BP Strategy 410 according to some embodiments of the present disclosure. Queue 500 is substantially similar to Queue 400 inasmuch as there are also three contact types occupying percentile ranges 0% to 48%, 48% to 82%, and 82% to 100%. Queue 500 also has three agents occupying percentile ranges of 0% to 33.3%, 33.3% to 66.6%, and 66.6% to 100%, correspondingly named "0.166 Agent", "0.500 Agent", and "0.833 Agent" to indicate their percentile range midpoints. Unlike Queue 400 (FIG. 4), each contact type is referred to by its percentile range rather than the midpoint of its range.

Efficient BP Strategy 510 improves on Inefficient BP Strategy 410 by seeking to most closely approximate a diagonal strategy. However, unlike the simplified case of Queue 300 which by example was able to precisely align contact and agent percentiles, Efficient BP Strategy 510 returns to targeting a balanced utilization of agents by relaxing the assumption of a one-to-one correspondence between contact types and agents and instead establishing a correspondence between ranges of percentiles.

In some embodiments, each contact may be assigned a percentile within the percentile range of each contact's type. These percentiles may be assigned randomly. In this scenario, some of the lowest-ordered, highest-frequency contacts (0% to 48% Contacts) may be preferably assigned to the lowest-ordered 0.166 Agent, while others of the lowest-ordered, highest-frequency contacts may be preferably assigned to the middle-ordered 0.500 Agent. Similarly, some of the middle-ordered, middle-frequency contacts (48% to 82% Contacts) may be preferably assigned to the middle-ordered 0.500 Agent, while others may be preferably assigned to the highest-performing 0.833 Agent.

For example, if a 0% to 48% Contact arrives, it may receive a random percentile of 10% (0.10). Assuming all of the agents in Queue 500 are available for assignment, the diagonal strategy would preferably assign this 0% to 48% Contact to the 0.166 Agent. Conceptually, a contact assigned a percentile of 10% falls within the percentile range (or "bandwidth") accorded to the 0.166 Agent occupying the percentile range of 0% to 33.3%.

The next contact to arrive may be another a 0% to 48% Contact. In this instance, the contact may receive a random percentile of 42% (0.42). Again, assuming all of the agents in queue 500 are available for assignment, the diagonal strategy would preferably assign this 0% to 48% Contact to the 0.500 Agent, which occupies the percentile range of 33.3% to 66.6%.

Under Efficient BP Strategy 510, each of the three agents is expected to receive approximately one-third of all contacts over time, so the lowest-ordered 0.166 Agent is no longer over-utilized relative to the other agents, and the highest-ordered 0.833 Agent is no longer under-utilized relative to the other agents, as under Inefficient BP Strategy 410 (FIG. 4). Moreover, in some cases, expected peak performance may be higher as in the case of Efficient BP Strategy 510 compared with that of Inefficient BP Strategy 410 because higher-ordered (e.g., higher-performing) agents are utilized more under Efficient BP Strategy 510 than under Inefficient BP Strategy 410.

Figure 6:
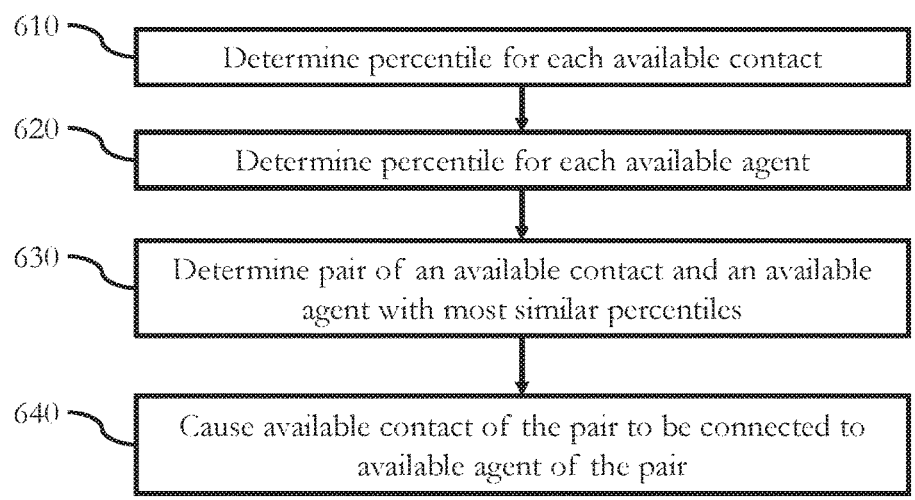
FIG. 6 shows a flow diagram of a behavioral pairing method according to embodiments of the present disclosure.

FIG. 6 depicts a behavioral pairing method 600 according to embodiments of the present disclosure. At block 610, behavioral paring method 400 may begin.

At block 610, a percentile (or n-tile, quantile, percentile range, bandwidth, or other type of "score" or range of scores, etc.) may be determined for each available contact. For situations in which contacts are waiting on hold in a queue, percentiles may be determined for each of the contacts waiting on hold in the queue. For situations in which contacts are not waiting on hold in a queue, a percentile may be assigned to the next contact to arrive at the contact center. The percentiles may be bounded by a range of percentiles defined for a particular type or group of contacts based on information about the contact. The percentile bounds or ranges may be based on a frequency distribution or other metric for the contact types. The percentile may be randomly assigned within the type's percentile range.

In some embodiments, percentiles may be ordered according to a particular metric or combination of metrics to be optimized in the contact center, and a contact determined to have a relatively high percentile may be considered to be a "higher-value" contact for the contact center inasmuch as these contacts are more likely to contribute to a higher overall performance in the contact center. For example, a relatively high-percentile contact may have a relatively high likelihood of making a purchase.

In some embodiments, a percentile may be determined for a contact at the time the contact arrives at the contact center. In other embodiments, a percentile may be determined for the contact at a later point in time, such as when the contact arrives at a particular skill queue or ACD system, or when a request for a pairing is made.

After a percentile has been determined for each contact available for pairing, behavioral pairing method 600 may proceed to block 620. In some embodiments, block 620 may be performed prior to, or simultaneously with, block 610.

At block 620, a percentile may be determined for each available agent. For situations in which agents are idle, waiting for contacts to arrive, percentiles may be determined for each of the idle agents. For situations in which agents for a queue are all busy, a percentile may be determined to the next agent to become available. The percentiles may be bounded by a range of percentiles (e.g., "bandwidth") defined based on all of the agents assigned to a queue (e.g., a skill queue) or only the available agents assigned to a particular queue. In some embodiments, the bounds or ranges of percentiles may be based on a desired agent utilization (e.g., for fairness, efficiency, or performance).

In some embodiments, agent percentiles may be ordered according to a particular metric or combination of metrics to be optimized in the contact center, and an agent determined to have a relatively high percentile may be considered to be a higher-performing agent for the contact center. For example, a relatively high-percentile agent may have a relatively high likelihood of making a sale.

In some embodiments, an agent's percentile may be determined at the time the agent becomes available within the contact center. In other embodiments, a percentile may be determined at a later point in time, such as when a request for a pairing is made.

After a percentile has been determined for each available agent and contact, behavioral pairing method 600 may proceed to block 630.

At block 630, a pair of an available contact and an available agent may be determined based on the percentiles determined for each available contact at block 610 and for each available agent at block 620. In some embodiments, the pair may be determined according to a diagonal strategy, in which contacts and agents with more similar percentiles (or the most similar percentiles) may be selected for pairing. For example, a behavioral pairing module may select a contact-agent pairing with the smallest absolute difference between the contact's score and the agent's score.

In some situations, multiple agents may be idle when a contact arrives (an L1 state). Under BP, the newly available contact may be paired with a selected one of the available agents that has a score more similar to the contact's score than other available agents. In other situations, multiple contacts may be waiting in a queue when an agent becomes available (an L2 state). Under BP, the newly available agent may be paired with a selected one of the contacts waiting in the queue that has a percentile more similar to the agent's percentile than other contacts waiting in the queue.

In some situations, selecting a pairing based on similarity of scores may result in selecting an instant pairing that might not be the highest performing instant pairing, but rather increases the likelihood of better future pairings.

After a pairing has been determined at block 630, behavioral pairing method 600 may proceed to block 640. At block 640, modules within the contact center system may cause the contact and agent of the contact-agent pair to be connected with one another. For example, a behavioral pairing module may indicate that an ACD system or other routing device may distribute a particular contact to a particular agent.

After connecting the contact and agent at block 640, behavioral pairing method 600 may end. In some embodiments, behavioral pairing method 600 may return to block 630 for determining one or more additional pairings (not shown). In other embodiments, behavioral pairing method 600 may return to block 610 or block 620 to determine (or re-determine) percentiles for available contacts or agents (not shown).

Figure 7:
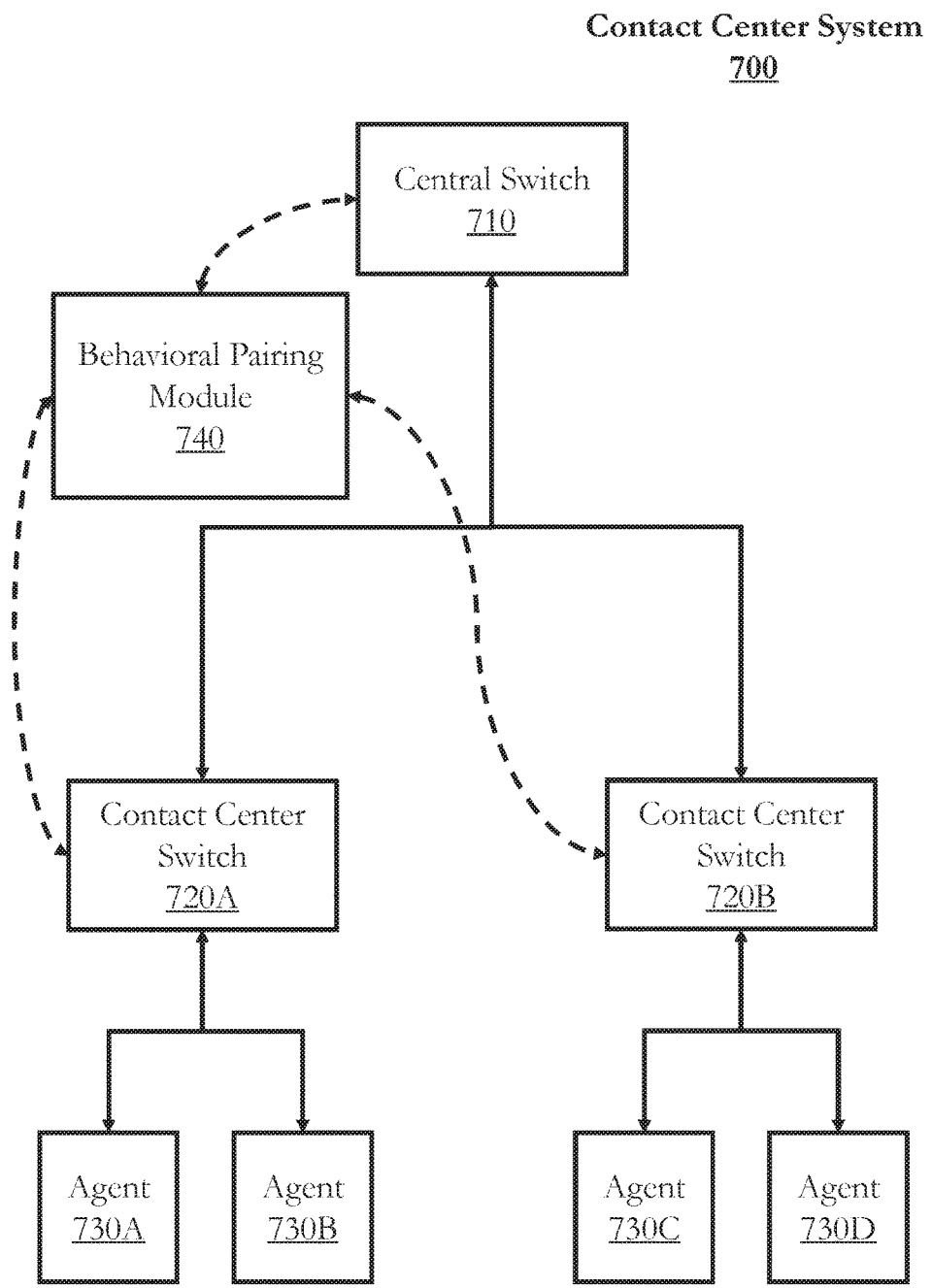
FIG. 7 shows a block diagram of a contact center system according to embodiments of the present disclosure.

FIG. 7 shows a block diagram of a contact center system 700 according to embodiments of the present disclosure. The description herein describes network elements, computers, and/or components of a system and method for simulating contact center systems that may include one or more modules. As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

As shown in FIG. 7, the contact center system may include a central switch 710. The central switch 710 may receive incoming contacts (e.g., callers) or support outbound connections to contacts via a dialer, a telecommunications network, or other modules (not shown). The central switch 710 may include contact routing hardware and software for helping to route contacts among one or more contact centers, or to one or more PBX/ACDs or other queuing or switching components within a contact center.

The central switch 710 may not be necessary if there is only one contact center, or if there is only one PBX/ACD routing component, in the contact center system 700. If more than one contact center is part of the contact center system 700, each contact center may include at least one contact center switch (e.g., contact center switches 720A and 720B). The contact center switches 720A and 720B may be communicatively coupled to the central switch 710.

Each contact center switch for each contact center may be communicatively coupled to a plurality (or "pool") of agents. Each contact center switch may support a certain number of agents (or "seats") to be logged in at one time. At any given time, a logged-in agent may be available and waiting to be connected to a contact, or the logged-in agent may be unavailable for any of a number of reasons, such as being connected to another contact, performing certain post-call functions such as logging information about the call, or taking a break.

In the example of FIG. 5, the central switch 710 routes contacts to one of two contact centers via contact center switch 720A and contact center switch 720B, respectively. Each of the contact center switches 720A and 720B are shown with two agents each. Agents 730A and 730B may be logged into contact center switch 720A, and agents 730C and 730D may be logged into contact center switch 720B.

The contact center system 700 may also be communicatively coupled to an integrated service from, for example, a third party vendor. In the example of FIG. 5, behavioral pairing module 600 may be communicatively coupled to one or more switches in the switch system of the contact center system 700, such as central switch 710, contact center switch 720A, or contact center switch 720B. In some embodiments, switches of the contact center system 700 may be communicatively coupled to multiple behavioral pairing modules. In some embodiments, behavioral pairing module 740 may be embedded within a component of a contact center system (e.g., embedded in or otherwise integrated with a switch).

Behavioral pairing module 740 may receive information from a switch (e.g., contact center switch 720A) about agents logged into the switch (e.g., agents 730A and 730B) and about incoming contacts via another switch (e.g., central switch 710) or, in some embodiments, from a network (e.g., the Internet or a telecommunications network) (not shown).

The behavioral pairing module 740 may process this information and to determine which contacts should be paired (e.g., matched, assigned, distributed, routed) with which agents. For example, multiple agents are available and waiting for connection to a contact (L1 state), and a contact arrives at the contact center via a network or central switch. As explained above, without the behavioral pairing module 740, a contact center switch will typically automatically distribute the new contact to whichever available agent has been waiting the longest amount of time for an agent under a "fair" FIFO strategy, or whichever available agent has been determined to be the highest-performing agent under a PBR strategy.

With a behavioral pairing module 740, contacts and agents may be given scores (e.g., percentiles or percentile ranges/bandwidths) according to a pairing model or other artificial intelligence data model, so that a contact may be matched, paired, or otherwise connected to a preferred agent.

In an L2 state, multiple contacts are available and waiting for connection to an agent, and an agent becomes available. These contacts may be queued in a contact center switch such as a PBX or ACD device ("PBX/ACD"). Without the behavioral pairing module 740, a contact center switch will typically connect the newly available agent to whichever contact has been waiting on hold in the queue for the longest amount of time as in a "fair" FIFO strategy or a PBR strategy when agent choice is not available. In some contact centers, priority queuing may also be incorporated, as previously explained.

With a behavioral pairing module 740 in an L2 scenario, as in the L1 state described above, contacts and agents may be given percentiles (or percentile ranges/bandwidths, etc.) according to, for example, a model, such as an artificial intelligence model, so that an agent coming available may be matched, paired, or otherwise connected to a preferred contact.

At this point it should be noted that behavioral pairing in a contact center system in accordance with the present disclosure as described above may involve the processing of input data and the generation of output data to some extent. This input data processing and output data generation may be implemented in hardware or software. For example, specific electronic components may be employed in a behavioral pairing module or similar or related circuitry for implementing the functions associated with behavioral pairing in a contact center system in accordance with the present disclosure as described above. Alternatively, one or more processors operating in accordance with instructions may implement the functions associated with behavioral pairing in a contact center system in accordance with the present disclosure as described above. If such is the case, it is within the scope of the present disclosure that such instructions may be stored on one or more non-transitory processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for pairing in a contact center system comprising:
    ordering, in the contact center system, a plurality of contacts within a skill queue for a first skill according to a computer processor-generated model based on information about a plurality of contact types corresponding to the plurality of contacts, wherein each of the plurality of contacts is waiting for connection in the contact center system to one of a plurality of agents having the first skill;
    selecting, according to a pairing strategy, by at least one computer processor communicatively coupled to and configured to operate in the contact center system, a first contact of the plurality of contacts for connection in the contact center system to a first agent of the plurality of agents having the first skill to optimize performance of the contact center system attributable to the ordering and the pairing strategy;
    outputting, by the at least one computer processor, the selection of the first contact for connection to the first agent in the contact center system; and
    establishing, by the at least one computer processor, in a switch module of the contact center system, a communication channel between communication equipment of the first contact and communication equipment of the first agent according to the output selection;
    wherein the first contact selected using the pairing strategy is not any of:
        a contact at a head of a queue in the contact center system,
        a longest-waiting contact,
        a highest-priority contact, and
        a randomly selected contact;
    wherein a first absolute difference in ordering between the first contact and the first agent is the smallest absolute difference in ordering among absolute differences in orderings between the first contact and each of the plurality of agents.

2. The method of claim 1, further comprising:
    ordering the first agent in a plurality of agents; and
    comparing, by the at least one computer processor, a first difference in ordering between the first contact and the first agent in a first pair with a second difference in ordering between a second contact of the plurality of contacts and the first agent in a second pair.

3. The method of claim 1, further comprising:
    ordering the first agent in a plurality of agents; and
    applying, by the at least one computer processor, a diagonal strategy to the orderings of the plurality of contacts and the first agent.

4. The method of claim 1, wherein a first pair of the first contact and the first agent comprises a worse expected instant outcome than a second pair of a second contact of the plurality of contacts and the first agent.

5. The method of claim 1, wherein a higher-ordered contact of the plurality of contacts remains available for subsequent assignment.

6. The method of claim 1, wherein the pairing strategy is a diagonal strategy, further comprising targeting, by the at least one computer processor, a balanced contact utilization using the diagonal strategy.

7. A system for pairing in a contact center system comprising:
    at least one computer processor communicatively coupled to and configured to operate in the contact center system, wherein the at least one computer processor is configured to:
        order, in the contact center system, a plurality of contacts within a skill queue for a first skill according to a computer processor-generated model based on information about a plurality of contact types corresponding to the plurality of contacts, wherein each of the plurality of contacts is waiting for connection in the contact center system to one of a plurality of agents having the first skill;
        select, according to a pairing strategy, a first contact of the plurality of contacts for connection in the contact center system to a first agent of the plurality of agents having the first skill to optimize performance of the contact center system attributable to the ordering and the pairing strategy;
        output the selection of the first contact for connection to the first agent in the contact center system; and
        establish, in a switch module of the contact center system, a communication channel between communication equipment of the first contact and communication equipment of the first agent according to the output selection;
    wherein the first contact selected using the pairing strategy is not any of:
        a contact at a head of a queue in the contact center system,
        a longest-waiting contact,
        a highest-priority contact, and
        a randomly selected contact;
    wherein a first absolute difference in ordering between the first contact and the first agent is the smallest absolute difference in ordering among absolute differences in orderings between the first contact and each of the plurality of agents.

8. The system of claim 7, wherein the at least one computer processor is further configured to:
    order the first agent in a plurality of agents; and
    compare a first difference in ordering between the first contact and the first agent in a first pair with a second difference in ordering between a second contact of the plurality of contacts and the first agent in a second pair.

9. The system of claim 7, wherein the at least one computer processor is further configured to:
    order the first agent in a plurality of agents; and apply a diagonal strategy to the orderings of the plurality of contacts and the first agent.

10. The system of claim 7, wherein a first pair of the first contact and the first agent comprises a worse expected instant outcome than a second pair of a second contact of the plurality of contacts and the first agent.

11. The system of claim 7, wherein a higher-ordered contact of the plurality of contacts remains available for subsequent assignment.

12. The system of claim 7, wherein the pairing strategy is a diagonal strategy, wherein the at least one computer processor is further configured to target a balanced contact utilization using the diagonal strategy.

13. An article of manufacture for pairing in a contact center system comprising:
 a non-transitory computer processor readable medium; and
 instructions stored on the medium;
 wherein the instructions are configured to be readable from the medium by at least one computer processor communicatively coupled to and configured to operate in the contact center system and thereby cause the at least one computer processor to operate so as to:
  order, in the contact center system, a plurality of contacts within a skill queue for a first skill according to a computer processor-generated model based on information about a plurality of contact types corresponding to the plurality of contacts, wherein each of the plurality of contacts is waiting for connection in the contact center system to one of a plurality of agents having the first skill;
  select, according to a pairing strategy, a first contact of the plurality of contacts for connection in the contact center system to a first agent of the plurality of agents having the first skill to optimize performance of the contact center system attributable to the ordering and the pairing strategy;
  output the selection of the first contact for connection to the first agent in the contact center system; and
  establish, in a switch module of the contact center system, a communication channel between communication equipment of the first contact and communication equipment of the first agent according to the output selection;
 wherein the first contact selected using the pairing strategy is not any of:
  a contact at a head of a queue in the contact center system,
  a longest-waiting contact,
  a highest-priority contact, and
  a randomly selected contact;
 wherein a first absolute difference in ordering between the first contact and the first agent is the smallest absolute difference in ordering among absolute differences in orderings between the first contact and each of the plurality of agents.

14. The article of manufacture of claim 13, wherein the at least one computer processor is further caused to operate so as to:
 order the first agent in a plurality of agents; and
 compare a first difference in ordering between the first contact and the first agent in a first pair with a second difference in ordering between a second contact of the plurality of contacts and the first agent in a second pair.

15. The article of manufacture of claim 13, wherein the at least one computer processor is further caused to operate so as to:
 order the first agent in a plurality of agents; and
 apply a diagonal strategy to the orderings of the plurality of contacts and the first agent.

16. The article of manufacture of claim 13, wherein a first pair of the first contact and the first agent comprises a worse expected instant outcome than a second pair of a second contact of the plurality of contacts and the first agent.

17. The article of manufacture of claim 13, wherein a higher-ordered contact of the plurality of contacts remains available for subsequent assignment.

* * * * *